5 Sheets—Sheet 1.
M. W. KIDDER.
PROCESS AND APPARATUS FOR GENERATING AND PURIFYING GAS.
No. 190,498. Patented May 8, 1877.
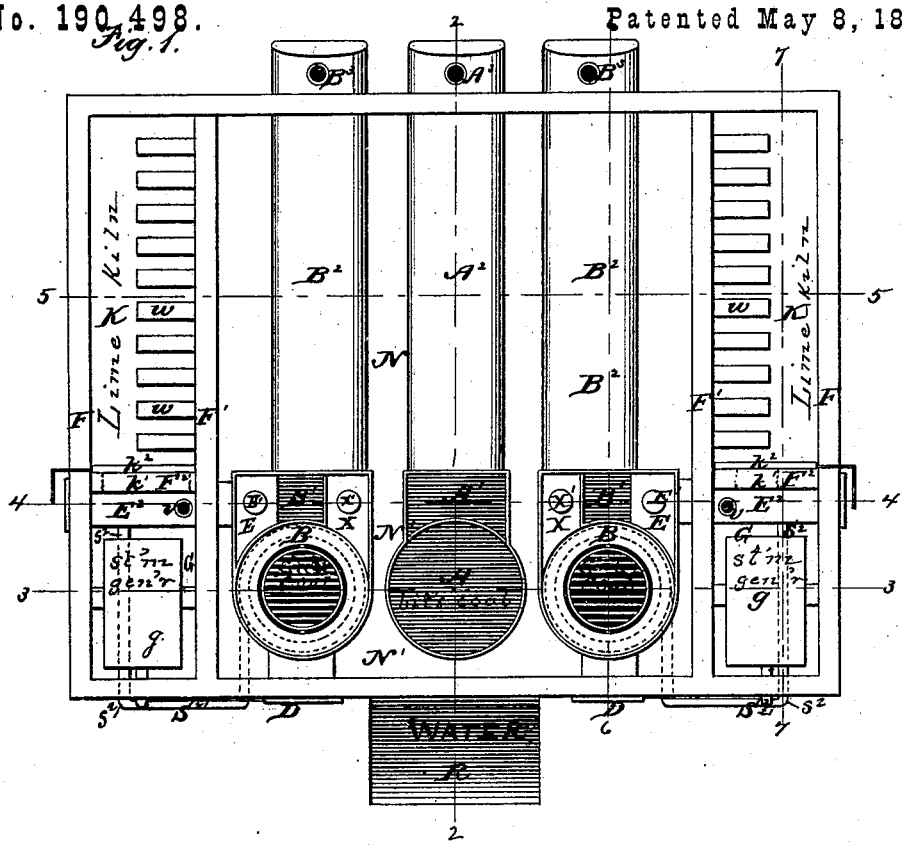
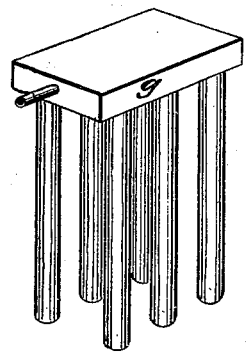
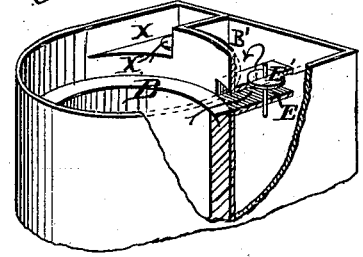
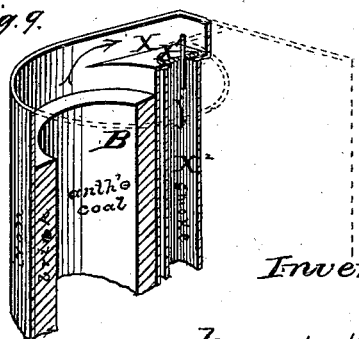
Witnesses.
C. F. Brown
Perion Noyes
Inventor.
Moses W. Kidder

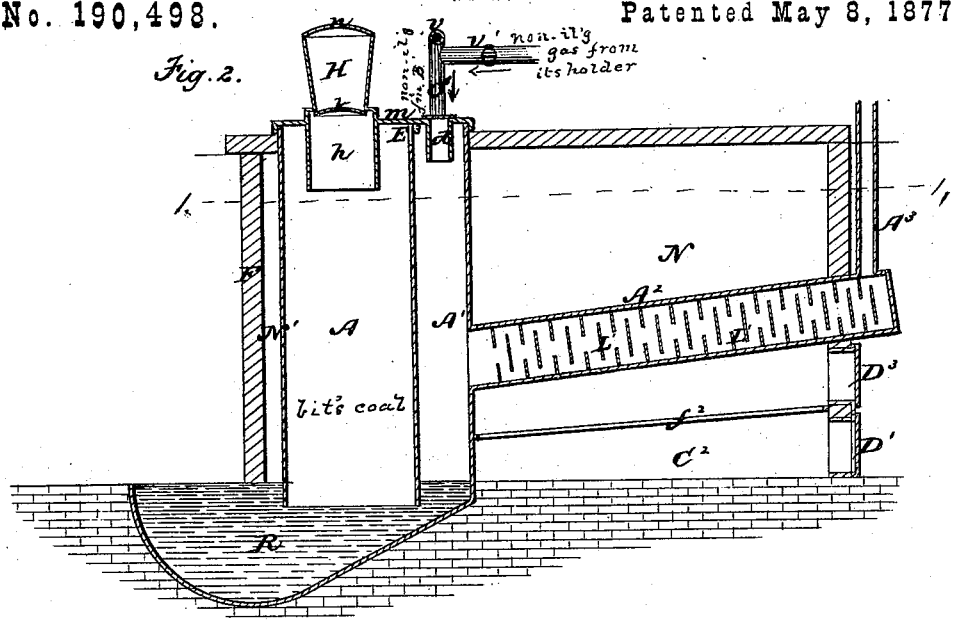
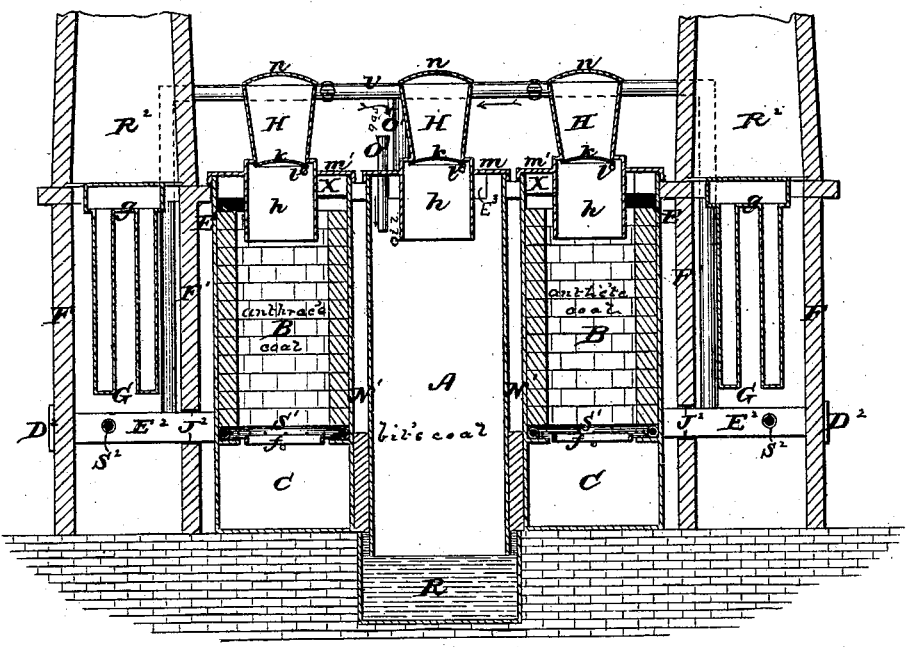

M. W. KIDDER.
PROCESS AND APPARATUS FOR GENERATING AND PURIFYING GAS.

No. 190,498. Patented May 8, 1877.

5 Sheets—Sheet 4.

M. W. KIDDER.
PROCESS AND APPARATUS FOR GENERATING AND PURIFYING GAS.

No. 190,498. Patented May 8, 1877.

Witnesses.
C. F. Brown
Person Noyes

Inventor.
Marc W. Kidder

N. PETERS, PHOTO-LITHOGRAPHER, WASHINGTON, D. C.

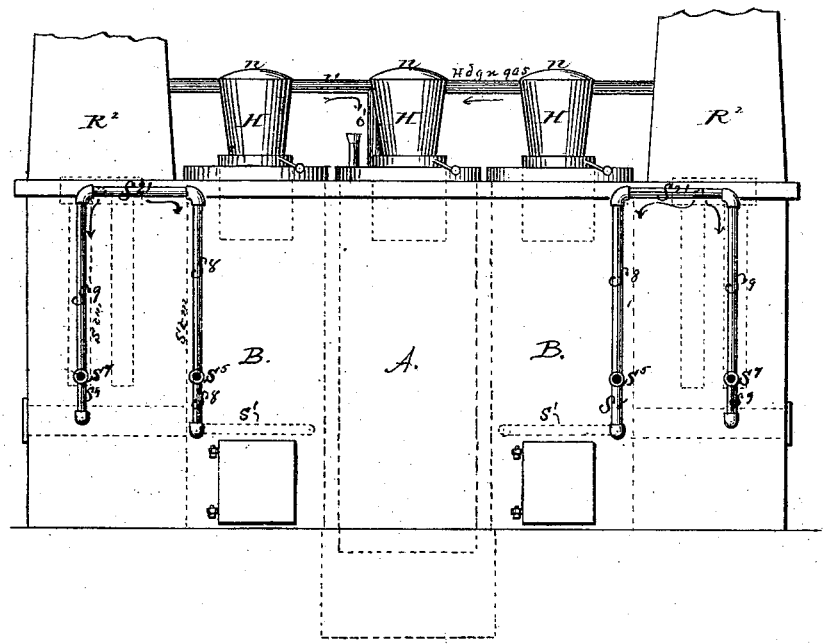

UNITED STATES PATENT OFFICE.

MOSES W. KIDDER, OF BOSTON, ASSIGNOR TO HIMSELF AND PERSON NOYES, OF LOWELL, MASSACHUSETTS.

IMPROVEMENT IN PROCESSES AND APPARATUS FOR GENERATING AND PURIFYING GAS.

Specification forming part of Letters Patent No. 190,498, dated May 8, 1877; application filed November 27, 1876.

*To all whom it may concern:*

Figure 4:
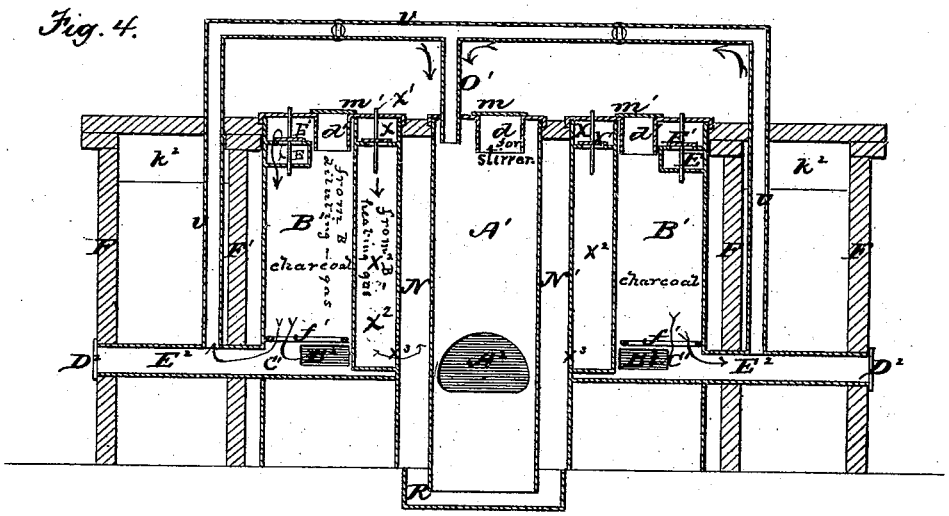
Figure 5:
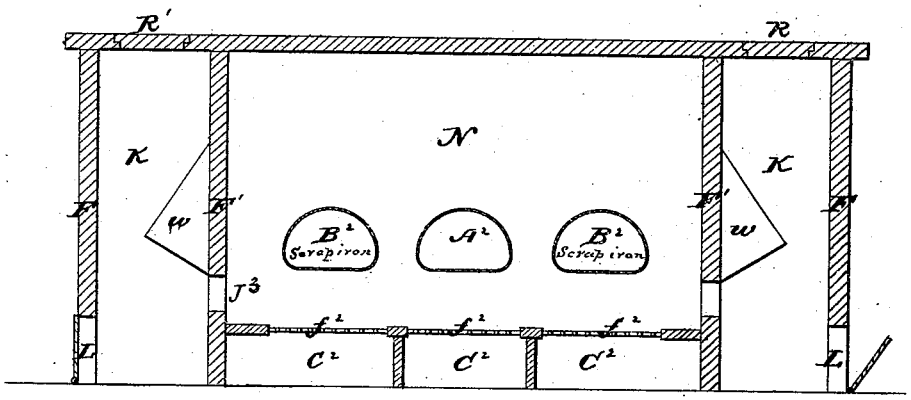
Figure 6:
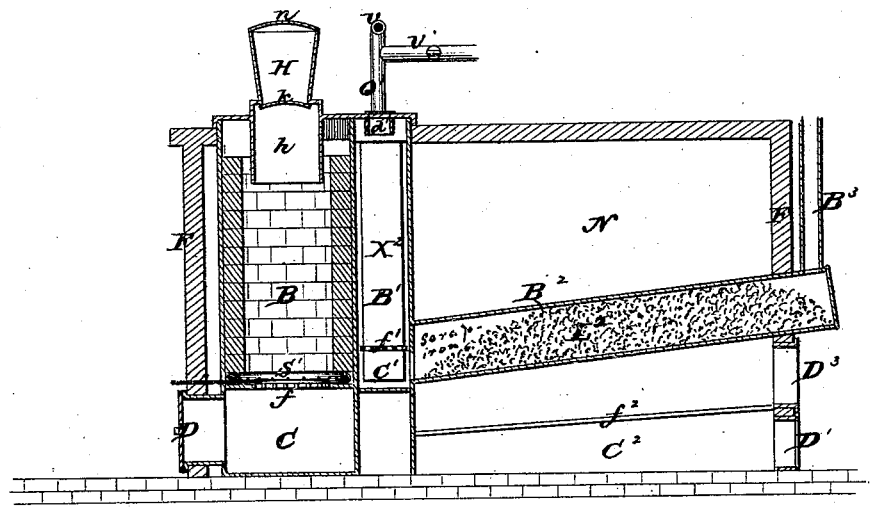
Figure 7:
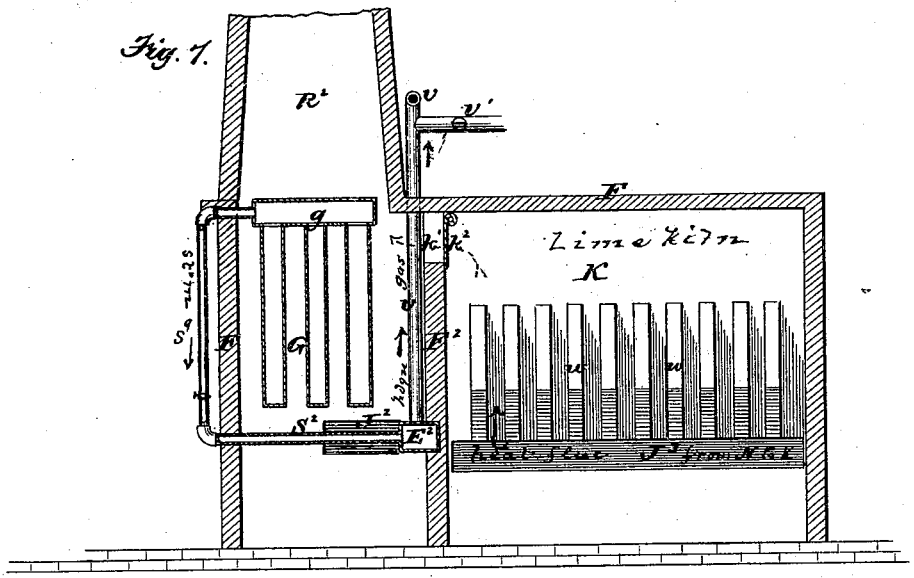
Figure 11:
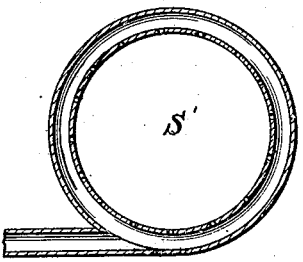

Be it known that I, MOSES W. KIDDER, of Boston, in the county of Suffolk and State of Massachusetts, have invented certain new and useful Improvements in Process and Apparatus for Making and Purifying Gas, of which the following is a specification:

In the accompanying drawings, forming a part of this specification, Figure 1 represents a horizontal section of my improved apparatus, taken on the plane of line 1 1, Fig. 2. Fig. 2 represents a vertical section taken on the plane of line 2 2, Fig. 1. Fig. 3 represents a vertical section taken on the plane of line 3 3, Fig. 1. Fig. 4 represents a vertical section taken on the plane of line 4 4, Fig. 1. Fig. 5 represents a vertical section taken on the plane of line 5 5, Fig. 1. Fig. 6 represents a vertical section taken on the plane of line 6 6, Fig. 1. Fig. 7 represents a vertical section taken on the plane of line 7 7, Fig. 1. Fig. 8 represents a perspective view of the upper part of one of the water-gas generators, part of the casing being broken away, and a portion being in section through valve E. Fig. 9 represents a similar view in section through valve X'. Fig. 10 represents a perspective view of one of the steam-generators. Fig. 11 represents a sectional view of one of the steam-pipes, S', removed from the hydrogen-generator, and Fig. 12 represents a front elevation of the apparatus.

This invention relates to certain new and useful improvements in the process and in the apparatus which is used for generating or producing and purifying gas.

The object of the invention is to improve the process and apparatus for the manufacture of illuminating and heating gas in such manner as to avoid the waste heretofore incident to this manufacture.

The invention consists, first, in the process herein described for producing non-illuminating gas in a closed retort: first, by means of coal in a lively state of combustion, caused by free admission of air at the bottom of the retort, as set forth; second, by closing the bottom and top of the retort, thus excluding air, or the oxygen and nitrogen, as explained; and, third, by means of steam introduced to and passed through said burning coal in said closed retort, and from this through incandescent charcoal, all substantially as hereinafter described. The carbonic oxide, carbonic acid, and hydrogen, with sulphide of hydrogen eliminated from fresh coal at or near the top of the combustion-chamber, are passed through incandescent charcoal, where the sulphide of hydrogen is transformed into sulphide of carbon, and the carbonic acid into carbonic oxide, as hereinafter stated.

Second, the invention also consists in the process herein described for producing illuminating-gas from bituminous coal and purified water-gas such as herein described: first, by means of the oily vapors as they are distilled from such coal at a low temperature in a closed chamber or retort, as set forth; second, by means of the purified carbonic oxide and hydrogen gas introduced and mingled with the vapors of the roasting coal in the trunk $A^1$, as specified; and, third, by means of all the vapors arising from the roasting coal, together with the purified water-gas, passed through a heated trunk or passage, to and through a highly-heated retort, all substantially as herein described.

Third, the invention further consists in the process herein described for producing illuminating-gas from bituminous coal, hydrocarbon oil, and purified water-gas: first, by means of the oily vapors as they are distilled from such coal at a low temperature, in a close chamber or retort, as described; second, by means of oil introduced and volatilized in contact with and above the roasting coal in such retort, and mingled with the coal-oil vapors; and, third, by means of hydrogen and carbonic oxide or water-gas, so called, when purified from carbonic acid mingled with all the vapors from the coal and oil, and then passed through a heated trunk or passage to and through a highly-heated retort, all substantially as described.

Fourth, the invention further consists, first, in the combination, in a gas-generating apparatus, of a vertical coal-distilling chamber, A, and a connected trunk, $A^1$, which are closed at both ends—at the top by a hopper and certain common devices, and at the bottom by the lower end of the retort—and the trunk dipping into and below the surface of water in a trough, R, an inclined retort, A², placed in a fire-room, N, which communicates with a corridor, N′, surrounding the vertical retort and trunk, and a passage, E³, with the trunk A¹ as the connecting mechanism of, and a conveyance for, mingled gases and vapors from the chamber A to the retort A², the roasting of the coal in the chamber A being effected by heat from the fire-room and corridor acting upon the external surface of the chamber, and the latter being so effectually closed as to exclude air and all other substances which would deteriorate the illuminating value of the gas made from the vapors therein generated, and at the same time capable of being fed with coal or other gas-producing substances, and supplied through pipe O′ with purified non-illuminating gas, substantially as and for the purpose described.

Fifth, the invention also consists in the combination, in a gas-generating apparatus, of a vertical coal-distilling chamber, A, closed at both ends, as described, an inclined retort, A², provided with gas-diverting plates L′, a passage, E³, and a trunk, A¹, as the connecting mechanism of, and a conveyance for, mingled gases and vapors from the chamber A to the retort A² and its gas-diverting plates L′, the retort A², the chamber A, and the trunk A¹ being surrounded by the fire-room N and the corridor N′, and heated externally, and the chamber A so sealed as to prevent admission of air to deteriorate the illuminating value of the vapors or the gas, and at the same time admitting of the ready removal of the coke from the lower end of the chamber A without breaking the seal, all substantially as described.

Sixth, the invention also consists in the water-sealing trough R in combination with, and receiving and sealing, the lower ends of both the coal-roasting chamber A and the connected gas-conveying trunk A¹, through which the gas passes to the retort A², or to this and its plates L′, substantially as described.

Seventh, the invention further consists in the pipe O in combination with, and entering and delivering oil through, the closed top and into the space above the roasting coal in the chamber A, which is sealed at the bottom, as described, and heated externally and provided with an aperture, E³, for escape of vapors from the top of the chamber A to the trunk A¹, and the coal-roasting chamber A being so effectually closed as to exclude air, which would deteriorate the illuminating value of the gas made from the vapors therein generated, all substantially as described.

Eighth, this invention also consists in the pipe O′, in combination with and entering and introducing gases through the closed top and into the space in the upper part of the trunk A, which is sealed at the bottom, as described, and heated externally, and provided with an aperture, E³, for ingress of vapors from the top of the connected coal-roasting chamber to the trunk A¹, both the chamber and the trunk being so closed as to exclude air, and thereby to prevent impoverishment of the gas made from the vapors generated in the coal-roasting chamber and mixed with the diluting gases entering the top of the trunk, all substantially as described.

Ninth, the invention also consists in the combination, in a hydrogen-gas-generating apparatus, of the grate $f$, steam-pipe S¹, coal-combustion chamber B, smoke-trunk X, having a valve, X¹, and pipe X², with the gas-trunk E, valve E¹, vertical trunk B¹, grate $f^1$, ash-pit C¹, and retort B², all operating substantially as and for the purpose described.

Tenth, the invention also consists in the smoke-trunk X, leading from the chamber B to the pipe X², the former provided with the valve X¹, and having an orifice, X³, opening into the corridor N¹, in combination with the latter and with the gas-generating chamber B, and as a conveyance for combustible or other gases from the chamber B to the corridor or fire-chamber, when kindling or arousing the fire in the chamber B, all substantially as described.

Eleventh, the invention also consists in the combination of the trunk E with its valve E¹, the charcoal-chamber B¹, and its ash-pit $c'$, with the hydrogen-generating or coal-combustion chamber B, and the gas-finishing retort B², and as a conveyance for gases from the chamber B to the retort B², substantially as described.

Twelfth, the invention further consists in the combination, in a gas-generating apparatus, and with the coal or oil distilling and gas-producing series, such as herein described, of a hydrogen-generating apparatus, as also herein described.

Thirteenth, the invention also consists in the combination, with a gas-generating apparatus, of a lime-kiln, K, constructed as described.

Fourteenth, the invention also consists in the combination of the combustion-chamber B and its connected vertical trunk B¹, both having ash-pits and grates for supporting coal in the first in a state of partial combustion, and in the latter incandescent, with and surrounded by the fire-room N and the corridor N¹, as shown and described, and so as to prevent the escape of heat from the coal in the chamber B, and to induce and support incandescence of the charcoal in the trunk B¹ by heat from the fire-chamber and the corridor, and from coal in the chamber B, substantially as and for the purpose described.

My improved gas-generating apparatus is constructed with the outer walls F and division-walls F¹, as shown in the several drawings. These walls are generally made of brick, and about eight feet high, with their several apertures, for the purposes hereinafter described. The hydrocarbon series, consist ing of the vertical coal-distilling chamber A, the connected vertical trunk $A^1$, having a passage, $E^3$, from the top of the former to the top of the latter, an inclined retort, $A^2$, opening into the side of the trunk, and a water-sealing trough, R, with the lower ends of both the chamber A and the trunk $A^1$ dipping into and below the water in the trough, the retort $A^2$ being set with grates $f^2$ beneath it in the rear fire-chamber N, which has free and open communication with the corridor $N'$, which, with the upper part of the fire-room N, surrounds the chamber A and the trunk $A^1$, thus admitting sufficient heat to the external surfaces of the chamber A, to roast the coal therein and to distil from it the oily vapors, but not to ignite the coal in any part of the chamber, or to convert its vapors into gases, and also sufficient heat to the external surface of the trunk $A^1$ to prevent condensation of the vapors as they pass from the chamber A to the retort $A^2$, the latter having beneath it grates for supporting coal, beneath which is an ash-pit, $C^2$.

Both the spaces above and below the grates $f^2$ are provided with doors $D^1$ and $D^3$ for closing the fire-room and ash-pit. The trough R not only provides for sealing the chamber A and the trunk $A^1$, but also for the removal of coke from either the chamber or the trunk without breaking the seal or allowing the admission of air or the escape of gas or vapor.

The coke referred to in the trunk $A^1$ is such as may result in the carbonization of impure oils distilled from the coal in the chamber collecting on the walls of the trunk, such coke being removed by a bar or other suitable instrument inserted through an aperture, D, which is tightly covered when not removing such coke for deposit.

The coke is removed from the sealing-trough R by a suitable rake or other implement, and coal is fed through a hopper to the chamber to supply the deficiency so produced.

The top $m$ is securely closed, covering both the chamber A and the trunk $A^1$. The former is provided with a hopper, H, through which coal or other gas-producing substance is fed to the chamber without allowing the admission of air or the escape of vapor or gas from the chamber.

The hopper is constructed and operated in the same manner as that in my former patent, dated July 6, 1875, No. 165,168. The pipe O, passing through the top $m$, entering the upper part of the chamber A, is for the purpose of introducing oil to the chamber above the roasting coal, where it may be used with economy to enrich the vapors distilled from the latter. I introduce non-illuminating gas through a pipe, $O'$, as a vehicle for the luminant vapors from the coal or oil. At a suitable distance below the top of the trunk $A^1$ is an opening communicating with the inner end of the retort $A^2$, which is so inclined as to allow any deposit in the retort to run or be moved to the trunk $A^1$, and into the water-trough R.

The retort $A^2$ is closed at its outer end, and the finished gas passes from the retort through the stand-pipe $A^3$ into the hydraulic main.

The hydrocarbon series above described, if inclosed by suitable walls, as I have contemplated, would be complete in itself for the production of the richest coal-gas obtainable, if undiluted, as by predetermined construction it admits of no destruction or waste of illuminating matter contained in the coal, and no air can enter to deteriorate the vapor of which the gas is made, whether the oil is used to enrich the vapors, or non-illuminating gas to dilute the same.

For general use, gas of a lower illuminating standard than that produced from rich coal, or from this and oil, is desirable, and, therefore, for the sake of economy in heat and fuel, I construct within the same inclosing-walls F one or more hydrogen-generators, each consisting of a coal-combustion chamber, B, of iron, lined with fire-brick, and a grate, $f$, below which is an ash-pit, C, with space for clearing, and a door, D, for tightly closing, the same, a trunk, $B^1$, with grates $f^1$ and ash-pit $C^1$, trunk E, valve $E^1$, trunk $E^2$, pipe $v$, steam-pipes $S^{21}$, $S^8$, and $S^1$.

The steam-pipe $S^1$ is annular, and its inside perforations deliver the steam to the incandescent coal at about the level with the grate in the chamber B. This chamber B, with its ash-pit, being about seven feet high, is provided at the top with a coal-feeding hopper like that in the top of the chamber A, and through the top above the trunk $B^1$ is an aperture, $d'$, for introducing charcoal to the trunk $B^1$. The aperture $d'$ is provided with a stopper for closing the same.

Immediately below the cover of the generator B is a trunk, X, having a valve, $X^1$, and opening into a vertical pipe, $X^2$, which leads downward to an opening, $X^3$, where the smoke escapes into the corridor $N^1$, outside of the generator, when air is admitted to the ash-pit to kindle or rouse the fire in the generator. Near the top $m'$ of the generator B I provide a second trunk, E, having a valve, $E^1$, and opening upward into the chamber $B^1$, to allow gases to pass from the chamber B to the chamber $B^1$ when the ash-pit doors and the valve $X^1$ are closed, and steam is admitted through the pipe $S^1$ to the generator B, the valve $X^1$ acting automatically by the pressure of the gas generated from the steam and the coal. The trunk $E^2$ enters one side of the ash-pit $C^1$, and through this trunk the ash-pit $C^1$ is cleared. A stopper, $D^2$, closes the end of this trunk. The steam-pipe $S^2$, extending from the pipe $S^9$, enters one side of the trunk $E^2$, and delivers steam therein and to the ash-pit $C^1$. The gas-pipe $v$ enters the top of the trunk $E^2$, and gas from the generator B may be passed through the trunk E, valve $E^1$, trunk $B^1$, ash-pit $C^1$, trunk $E^2$, pipes $v$ and $O'$ to the trunk $A^1$ of the hydrocarbon series to dilute the rich gas, if desired.

The walls $F^1$ and $F^2$ separate the fire-room

N and corridors $N^1$ containing the several chambers or retorts, the limekilns, and the steam-generating room G, from each other. In the room G I place the steam-generator $g$ for producing and superheating steam by the waste heat passing to the chimney $R^2$. A pipe, $v'$, entering the pipe $O'$, is for the admission of non-illuminating gas to the trunk $A^1$, through the pipes $v'$ and $O'$, or pipes $v'$ and $O'$ from a gas-holder, where purified gas has been stored for diluting rich gas made from coal in the chamber A. The walls $F^1$ $F^2$ have suitable openings $J^2$ and $J^3$ and $k^1$, for the passage of heated gases from the fires in the fire-room N to the limekilns and to the steam-generating rooms, and from the limekilns to the chimneys $R^2$, which surmount the steam-generating rooms G. The opening $k^1$ from the limekiln K is provided with a gate, $k^2$, closing the same. The side walls F have each an opening, L, at the bottom, for removing the lime, and also a passage for the trunk $E^2$ to the ash-pit $C^1$ beneath the vertical trunk $B^1$. The rear wall has a plate of metal on its outer surface, through which pass the outer ends of the retorts $A^2$ and $B^2$. The fire-room and ash-pit doors $D^1$ $D^3$ close openings through this plate and rear wall.

In Fig. 12 I have shown the steam-pipe $S^{21}$, for conveying steam to the vertical steam-pipes $S^8$ and $S^9$, from which the steam passes into the apparatus as follows: through the pipe $S^8$ into and through the pipe $S^1$, and from its perforations into the combustion-chamber B, about on a level with the grate. Steam also passes through a pipe, $S^9$, and from this into and through the pipe $S^2$, trunk $E^2$, ash-pit $C^1$, and into and through the retort $B^2$.

When using that part of the apparatus designated as the hydrogen series for making non-illuminating gas, the retort is closed at the bottom and at the top, and the gas passes through the trunk E and its valve $E^1$, which valve is automatically opened by the force of the gases generated in the chamber B, and passing to the trunk $B^1$, as before described.

It will be seen that by surrounding the chambers B and trunk $B^1$ by the corridor $N'$ and the fire-room N, as shown, strong heat, acting upon the external surface of the chamber and the trunk, will contribute to maintain the coal in the chamber B and the trunk $B^1$ in a state of incandescence.

In the inclined retorts $A^2$ and $B^2$ I generally place gas-diverting plates $L'$ of scrap-iron, the object of which is to retain and constantly throw gas against the sides of the retort, and thereby to expose it to the most intense heat. The space K, bounded by the walls F, $F^1$, and $F^2$, is the kiln, wherein to burn the lime used in purifying the gases. An aperture, $J^3$, in the wall $F^1$, with the fenders $w$, allows the heated gases and flames from the fire-room N in their passage to the chimney to circulate through and around the lime, and between the fenders, back of the lime resting against them, thereby allowing such heated gases and flames to act upon the lime with force and energy before they pass through the aperture $k^1$ in the wall $F^2$. Through the top of the kiln K is an opening, $R'$, for introducing lime to be burned, and at the bottom an aperture, L, through the wall F, for removing the burned lime. The passage $k^1$ is closed by a gate, $k^2$, and the passage L by a door.

The flow of flame and heated gas through the kiln is regulated by the gate $k^2$.

Having fully described my gas generating and purifying apparatus, I will now describe its operation.

Having supplied the trough R and the steam-generator $g$ with water, and the coal-distilling chamber A with coke up to the level of the under side of the inclined retort $A^2$ at the inner end thereof, I then charge the chamber with bituminous coal above the coke therein, until the gate $k$ in the hopper is partially obstructed in its operation by the coal below it. I then close the gate $k$, and the cover $n$ of the hopper H of the hydrocarbon series, and if one or both of the hydrogen series are to be used in connection, the trunks $B^1$ are filled with charcoal and closed. I next kindle fires upon the grates $f^2$, under the retorts $A^2$ and $B^2$, and after this the fires in the hydrogen-generators B, which I also fill with coke and anthracite coal until the gate $k$ in the hopper is partially obstructed, when the gates and the covers $n$ are closed. The valve $X^1$ in the smoke-pipe X being open, the smoke passes downward through the pipe $X^2$ to and through the aperture $X^3$ into the corridor $N'$ communicating with the chimneys. The fires having become sufficiently active, the retorts $A^2$ and $B^2$ are at a cherry-red heat, and the heat in the fire-room N and the corridor $N'$ surrounding the chamber A and trunk $A^1$ imparts sufficient heat to their external surfaces, and through the walls of the coal-chamber, to roast the coal therein, and to distil the vapors from the same. The gases from the aperture $X^3$ are now inflammable and burning in the corridor $N'$, and ready to be turned in another direction, and used for diluting rich gas made in the hydrocarbon series. At this time the bituminous coal in the chamber A is beginning and continues to yield rich gas-producing oils in the form of vapor, which passes through the outlet $E^3$ and the trunk $A^1$ into and through the retort $A^2$, where they are converted into permanent gas by contact with the highly-heated surfaces. From here the gas passes through the stand-pipe $A^3$ to the hydraulic main of the hydrocarbon series, and thence through purifiers to a gas-holder.

In order to dilute the rich gas produced in the hydrocarbon series, the desired quantity of non-illuminating gas made in the hydrogen series is passed into the upper part of the trunk $A^1$ through the pipes $v$ and $O'$ or $v'$ and $O'$, first closing the ash-pit door D and the valve $X^1$, thus changing the course of the gas, and causing it to pass through the trunk E and valve $E^1$ into and through trunk $B'$, containing incandescent charcoal, and from the bottom of this to the ash-pit $C^1$, and either through the trunk $E^2$ and the pipes $v$ and $O'$ into the trunk $A^1$, if desired, or from the ash-pit $C^1$ through the retort $B^2$ and the stand-pipe $B^3$ and the hydraulic main of the hydrogen series through purifiers to a separate gas-holder, from which it may be drawn through the pipe $v'$ and the pipe $O'$ into the trunk $A^1$, as before described. When the gas-producing coal in the chamber A is deficient in illuminating matter, or for economic reasons, this may be supplied by the introduction of oil through the pipe O. As no air enters the chamber A in either of the gas-diluting or gas-enriching processes above described, the gas will be as free from nitrogen as coal-gas produced by the ordinary method.

The principal object of the described construction and combination of elements constituting the hydrocarbon apparatus, and the process of making gas by roasting coal at a low temperature in a closed chamber without air, distilling the gas-producing vapors from the coal, and subsequently mixing purified water-gas with these vapors, and passing the same through highly-heated retorts, where they are converted into fixed gas, is to prevent the vapors of the gas coming in contact with the incandescent carbon, which, instead of benefiting the gas, separates the carbon from the rich hydrocarbon, thus destroying the illuminating power of the gas by reducing it to marsh-gas.

When the ash-pit door D and the valve $X^1$ in the smoke-pipe $X^2$ are closed to turn the gas through the trunk E, as before described, in making non-illuminating gas, I introduce steam through pipes $S^8$ and $S^1$ to the coal in the chamber B, which steam is decomposed, forming carbonic oxide and hydrogen. It becomes necessary at intervals to open the valve in the smoke-pipe $X^2$, and also the ash-pit door D, to admit air to re-arouse the fire for a short time.

The purpose of the incandescent charcoal in the trunk $B^1$ is to decompose the sulphide of hydrogen from the coal near the top of the chamber B, and to transform such sulphide of hydrogen into sulphide of carbon—a comparatively inoffensive gas; also, to arrest carbonic acid and reduce it to carbonic oxide. The same top which covers the limekilns also covers the fire-room N from the rear wall to the rear sides of the trunks $A^1$ and $B^1$.

The vertical distilling-chamber A, with suitable inclosures, might be added to the old retorts as now set, putting the coal into the vertical and not into the horizontal retorts. This would result in gas of a uniformly-higher illuminating standard, and greatly reduce the labor of charging and discharging the retorts.

I claim as my invention—

1. The process herein described for producing illuminating-gas, first, by raising anthracite coal or coke to a lively state of combustion by the free admission of air, then excluding the air or the oxygen and nitrogen thereof, as explained, then passing steam into the burning coal, and then immediately and continuously passing the mingled products through incandescent charcoal, all substantially as set forth.

2. The process for producing illuminating-gas from bituminous coal and non-illuminating gas, which consists in distilling the vapors from such coal at a low temperature, as described, and mingling with such coal-oil vapors, purified water-gas, and immediately and continuously heating the mixture and finally subjecting the same to a fixing heat, as set forth.

3. The process for producing illuminating-gas from bituminous coal, hydrocarbon oils, and non-illuminating gas, which consists in distilling the vapors from such coal and hydrocarbon oil dropped upon such coal at a low temperature, as described, and mingling with such coal and oil vapors purified water-gas, or carbonic oxide and hydrogen when purified, and continuously heating the mixture, and finally subjecting the same to a fixing heat, as set forth.

4. The combination, in a gas-generating apparatus, of a vertical coal-distilling chamber, A, closed at both ends, an inclined retort, $A^2$, and a passage, $E^3$, and trunk $A^1$, as the connecting mechanism for the conveyance of mingled gases and vapors from the chamber A to the retort $A^2$, substantially as described.

5. The combination, in a gas-generating apparatus, of a vertical coal-distilling chamber, A, closed at both ends, an inclined retort, $A^2$, and passage $E^3$, and trunk $A^1$, as the connecting mechanism for the conveyance of mingled gases and vapors from the chamber A to the retort $A^2$, the latter provided with gas-diverting plates $L'$, substantially as described.

6. The sealing-trough R for water, in combination with, and receiving, retaining, and sealing, the lower ends of the chamber A and trunk $A^1$, substantially as described.

7. The combination of the oil-pipe O, sealed and externally-heated chamber A, aperture $E^3$, trunk $A^1$, and retort $A^2$, substantially as and for the purpose described.

8. The pipe $O'$, in combination with the trunk $A^1$ and aperture $E^3$, substantially as and for the purpose described.

9. In a hydrogen-gas-generating apparatus the combination of grate $f$, steam-pipe $S^1$, coal-combustion chamber B, smoke-trunk X, valve $X^1$, and pipe $X^2$, with the gas-trunk E and valve $E^1$, vertical trunk $B^1$, grate $f^1$, ash-pit $C^1$, steam-pipe $S^2$, and retort $B^2$, all operating substantially as and for the purpose specified.

10. The trunk X with its valve $X^1$, and the pipe $X^2$ with its orifice $X^3$, in combination with, and as a conveyance for, combustible gases from the hydrogen-generating chamber B to the corridor or fire-chamber, substantially as and for the purpose described.

11. The combination of the trunk E with its valve $E^1$, the chamber $B^1$, and ash-pit C with and as a conveyance for gases from the hydrogen-generating chamber B to retort $B^2$, substantially as and for the purpose specified.

12. In a gas-generating apparatus the combination of the coal or oil distilling and gas-producing series, consisting of the chamber A, trunk $A^1$, retort $A^2$, passage $E^3$, pipe $O'$, and trough R, with the hydrogen-generating apparatus, consisting of the combustion-chamber B, vertical trunk $B^1$, ash-pit $C^1$, trunk E, valve $E^1$, pipe V, steam-pipe $S^{21}$ $S^3$ $S^1$, the latter introducing steam in its passage to the hydrogen-generator, and the latter generator being additionally heated externally by the fire and heat in the corridor or fire-room, substantially as and for the purpose described.

13. In combination with a gas-generating apparatus, the lime-kiln K, constructed, as described, with double inclined-fenders in and an opening for heat beneath them, a covered inlet, $R^1$, for introducing lime, and an outlet, L, for removing the latter, all arranged in the manner and for the purpose described.

14. The combination of the combustion-chamber B and its connected vertical trunk $B^1$, both having ash-pits and grates for supporting coal in the first in a state of partial combustion, and in the latter incandescent with, and surrounded by, the fire-room N and corridor $N'$, as shown and described, and so as to prevent the escape of heat from the coal in the chamber B, and to induce and support incandescence of the charcoal in the trunk $B^1$ by heat from the fire-chamber and the corridor, and from the chamber B, substantially as and for the purpose described.

In testimony whereof I have signed my name to this specification in the presence of two subscribing witnesses.

MOSES W. KIDDER.

Witnesses:
C. F. BROWN,
PERSON NOYES.